Nov. 30, 1965  F. L. CHRISTENSEN  3,220,100
APPARATUS FOR UNPLUGGING LEAD BONDING CAPILLARY TOOLS
Filed March 31, 1964
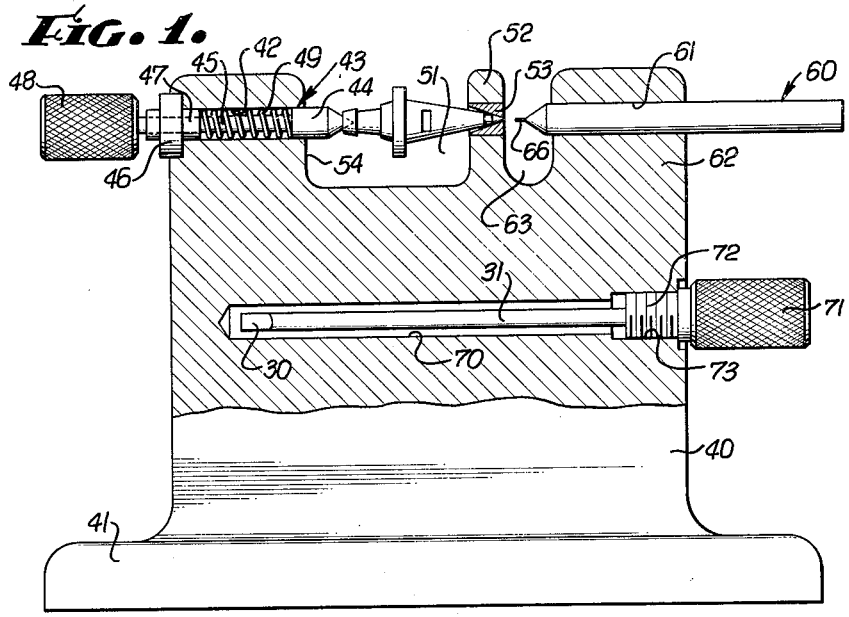
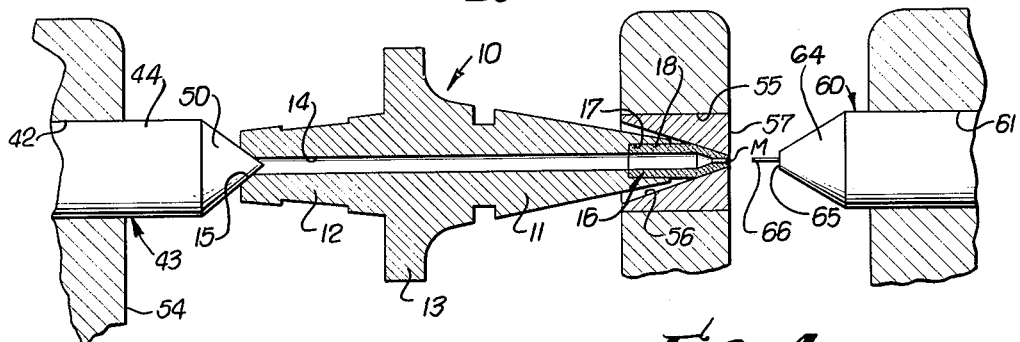
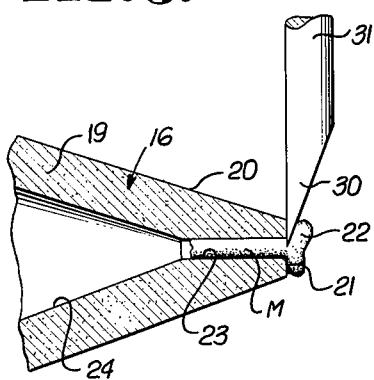
INVENTOR.
FRANK L. CHRISTENSEN
BY
Bernard Kriegel
ATTORNEY.

United States Patent Office 3,220,100
Patented Nov. 30, 1965

3,220,100
APPARATUS FOR UNPLUGGING LEAD BONDING CAPILLARY TOOLS
Frank L. Christensen, Saratoga, Calif., assignor to Tempress Research Co., Sunnyvale, Calif., a corporation of Utah
Filed Mar. 31, 1964, Ser. No. 356,281
5 Claims. (Cl. 29—244)

The present invention relates to apparatus for unplugging small orifices, and more particularly to orifices of electric lead bonding tools through which a lead wire is threaded.

Heretofore, difficulty has been encountered in unplugging clogged orifices of lead bonding tools used in effecting molecular diffusion or welding between a lead wire and semiconductor material. The orifices are of small diameter, some of them being as small as 0.0005 inch in diameter, and they have a length several times their diameter. Accordingly, a tool for unplugging the orifice includes parts of miniature dimensions which are relatively fragile, requiring proper alignment with the orifice and movement in alignment therewith if damage to the tool parts is to be avoided and the orifice appropriately cleared or unplugged.

Accordingly, it is an object of the present invention to provide an improved apparatus or fixture for unplugging lead bonding capillary tools or tips having orifices of comparatively small diameters.

Another object of the invention is to provide an apparatus or fixture for unplugging or clearing lead bonding capillary tools or tips in which the tool or tip is automatically and readily aligned with the unplugging punch, insuring against damage to the small and fragile parts of the apparatus.

A further object of the invention is to provide an apparatus or fixture for unplugging or clearing lead bonding capillary tools or tips in which the tip can be assembled in the apparatus or fixture in a rapid manner, readily and automatically aligned with the unplugging punch, the punch being guided accurately into the orifice of the tool or tip to effect its unplugging, and the cleared tip readily disassembled from the apparatus.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a vertical section, with parts shown in side elevation, of an apparatus or fixture with a capillary tip therein to be unplugged;

FIG. 2 is an enlarged vertical section through the upper portion of the apparatus shown in FIG. 1;

FIG. 3 is an enlarged longitudinal section through the forward portion of the tip disclosing excess lead wire being sheared therefrom;

FIG. 4 is an enlarged view illustrating the movement of the punch in the orifice or bore of the tip.

The apparatus or fixture illustrated in the drawings is shown in conjunction with a tip or capillary tube 10 used for bonding electric lead wire to an associated member (not shown), such as semiconductor material. The specific tip illustrated forms the subject matter of my application for "Electric Lead Wire Bonding Tools," Serial No. 356,282, filed March 31, 1964.

The tip 10 includes a main body 11 having a tapered head 12 for insertion in a companion socket (not shown) of the bonding tool, there being an outwardly directed flange 13 adjacent to the large end of the tapered head for attraction by a magnet (not shown) forming part of the bonding tool, the main body of the tool being made of magnetic material, such as magnetic stainless steel.

The main body of the tip has a central passage 14 therein of a much larger diameter than the lead wire to be threaded through it from its rear end, which is tapered in a rearward direction to form a flaring guide mouth 15. A hard tip insert 16 is mounted in a counterbore 17 in the forward end of the main body of the tip, being suitably secured thereto, as by a press-fit or by brazing. This tip has a cylindrical portion 18 disposed in the counterbore and a forward nose 19 having a tapered or conical surface 20 formed at a precise angle to the central axis of the tip. The forward flat end base 21 of the tapered nose can be pressed against a ball-shaped end 22 of the lead wire, forcing it against a companion semiconductor material (not shown), there being a small diameter bore or orifice 23 opening through this forward face or end which has a precise diameter conforming closely to the diameter of the wire threaded therethrough. The diameter of the orifice 23 is much smaller than that of the large passage 14 through the tip and the cylindrical part 18 of the insert, there being a suitable tapered passage 24 interconnecting the enlarged cylindrical passage portion of the tip with the rear end of the cylindrical orifice 23. The orifice itself has a length of about three to ten times its diameter.

The insert 16 may be made of a suitable material, such as sintered tungsten carbide. Its exterior tapered surface 20 can be ground with extreme precision and its orifice bore is also finished very accurately. The wire threaded through the passage 14 and orifice 23 may be as small as 0.0007 inch in diameter and typically may be 0.001 inch in diameter, the orifice diameter being but slightly greater than the diameter of the wire. The tapered rear end or mouth 15 of the head 12 forming the entry guide to the passage 14 is also formed with precision as to finish and degree of taper.

In the use of the tip, lead wire material M might plug the orifice 23, and it is necessary to clear the same. As shown by way of example in FIG. 3, a piece of lead wire is plugging or clogging the orifice, a portion of the wire 22 forwardly of the end face 21 of the tip having been compacted against the latter. Through use of the sharp blade end 30 of a suitable shearing knife 31, the excess lead wire material 22 externally of the orifice 23 can be cut off, whereupon the tip 10 is mounted in the fixture so that the lead wire material M in the orifice can be forced therefrom.

As shown, the fixture or apparatus includes a main body or frame 40 having a base 41 adapted to rest upon or be secured to a suitable support (not shown). The upper portion of the body has a rear horizontal cylindrical bore 42 in which a spindle or tail stock 43 is slidably mounted. A cylindrical portion of the head 44 of the spindle makes a snug sliding fit with the wall of the bore 42 and has a stem 45 integral therewith and extending therefrom, which is slidable through a bushing or spring seat 46 having a forward portion 47 piloted within the bore 42 with a press fit to secure the bushing to the body 40.

The stem 45 is attached to a knurled knob 48 externally of the spring seat, which can be grasped by a person's fingers to shift the spindle 43 in a rearward direction against the force of a helical compression spring 49 surrounding the stem 45 in the spindle bore, the forward end of the spring engaging the spindle head 44 and its rear end engaging the spring seat 46. The spring 49 urges the head in a forward direction to the extent limited by engagement of the knurled knob 48 with the spring seat 46. The forward portion 50 of the head of the spindle or tail stock is conical in shape, the angle of taper conforming closely to the angle of taper of the mouth 15 of the rear head end of the tip 10.

The head 44 of the spindle projects partially from the spindle bore 42 into a cavity, opening or slot 51 in the upper portion of the body, the forward end of the opening being defined by a vertical wall or partition 52 in which a tapered seat 53 can be secured in precise alignment with the spindle or tail stock 43. The distance between the intermediate wall or partition 52 and the forward face 54 of the rear spindle supporting portion of the body or frame 40 is greater than the over-all length of a tip 10 to be mounted in the fixture or apparatus.

As shown, the tapered seat 53 is mounted within a cylindrical bore 55 formed in the wall or partition in precise alignment with the spindle bore 42. The tapered seat may be made of a suitable material, as, for example, stainless steel, and has a tapered socket or bore 56 therein diverging in a rearward direction, the angle of its taper conforming precisely to the angle of taper of the nose 20 of the tip or tip insert 16. The small end of the tapered bore 56 has a diameter substantially the same as the diameter of the small end of the tapered nose 19 of the tip insert so that when the tip is disposed within the tapered socket of the seat 53, the end face 21 of the tip insert 16 will be located substantially at the forward end face 57 of the seat. The seat 53 is suitably secured in the wall or partition 52, as by a press or interference fit in its bore 55.

A punch 60 is slidably mounted in a horizontal bore 61 in the forward portion 62 of the body or frame 40, the punch being adapted to extend into a space, slot or cavity 63 formed between the punch supporting portion of the body or frame and the wall or partition 52. The cylindrical bore 61 for the punch is formed in precise alignment with and coaxially of the tapered socket 56 and the spindle bore 42, the cylindrical portion of the punch slidable in the punch bore 61 conforming closely in diameter to the diameter of such bore 61. The rearward portion 64 of the punch is tapered in a rearward direction, terminating in an end face 65 from which a cylindrical punch 66 projects which conforms closely in diameter to the diameter of the orifice 23, being only slightly less than the diameter of the latter so as to make a close sliding fit therewith when moved into the orifice. The punch 66 preferably has a length which is no more than about five to about fifteen times its diameter, depending upon the length of the orifice 23 to be unplugged. As stated above, the orifice is preferably from about three to about ten times its diameter. If the ratio of the length of the orifice 23 to its diameter were much greater than the proportions referred to, it might be difficult to clear it of the lead wire material M upon its becoming plugged or clogged.

All elements of the spindle or tail stock 43, punch 60, capillary tip 10, and the tapered seat 53 are manufactured with extreme precision to insure their alignment. Moreover, the punch bore 61, spindle bore 42, and bore 55 in which the tapered seat is inserted are also made with precise concentricity to assure precise automatic alignment of all of the parts. The securing of the precise alignment between the several bores 61, 42, 55 can be obtained, for example, by first drilling a single horizontal bore from one end of the body 40 to its opposite end prior to formation of the spaced cavities or openings 51, 63. Such single bore can be finished precisely, whereupon the upper material of the body or frame can be milled or otherwise cut away to form the cavity 51 for the tip and the space 63 rearwardly of the punch bore 61, leaving the wall or partition 52 therebetween.

Assuming the orifice 23 of a tip to be plugged with lead wire M, any excess material 22 can be removed therefrom through use of the shearing knife 36 in the manner illustrated in FIG. 3. For convenience, the body 40 may have an elongate socket 70 therein in which the blade of the shearing knife 31 can be retained, the outer end of the shearing knife having a knurled knob or handle 71 and a portion 72 thereof being suitably threaded for threading into a companion threaded portion 73 of the socket, as illustrated in FIG. 1. After the excess lead wire material or flattened "nail head" 22 has been cut away by the knife, the knurled knob 48 of the spindle can be pulled outwardly against the force of the spring 49, the forward nose 19 of the tip 10 being placed in the tapered socket 56 and the knob 48 moved in a forward direction to place the tapered forward end 50 of the spindle into the tapered mouth 15 of the tip passage, the spring urging the spindle forwardly and effecting a seating of the tapered nose or periphery 20 of the tip insert with the wall 56 of the tapered bore, the periphery of the tapered forward end 50 of the spindle snugly and closely engaging the tapered mouth 15. Because of the precision with which all of the parts and their companion bores and passages are made, the tip 10 will be held concentric with the punch 60. More particularly, the orifice 23 will be absolutely concentric or aligned with the small diameter orifice clearing punch 66. The punch 60 is shifted forward gently in its companion bore 61 while being rotated back and forth between a person's fingers. The small diameter punch portion 66 is guided automatically into the orifice or bore 23 of the capillary tip, and will depress the lead wire material or debris M back into the larger diameter passage 14 of the tip. As a precautionary measure, the punch should be inserted only about three-quarters of its length into the bore 23 since further insertion may cause the punch to jam near its face 65 where it is integral with the tapered rear part 64 of the punch.

The punch 66 is withdrawn from the orifice 23, and the knurled knob 48 pulled backwardly against the force of the spring 49 so that the tip 10 can be removed from the fixture. With the tip insert 16 facing upwardly, the rear end of the tip can be tapped gently on a hard surface to jar loose any debris in its passage 14, which will drop out through the tapered mouth 15.

Because of the precise alignment of all of the parts, including the precision with which the parts of the tip 10 are formed, the latter is easily inserted and held in a concentric position in the fixture, with its orifice 23 absolutely concentric and aligned with the small diameter punch element 66. The tip 10 may be rotated several times to insure proper seating of its point or nose 19 in the socket bore 56. The punch 60, as indicated above, is aligned with the bore 23 and will pass readily into the latter, to clear it of the undesired material therewithin.

I claim:

1. In apparatus for unplugging a lead bonding capillary tip having a passage therethrough terminating in an orifice at its forward end; a body having rear and forward bores coaxial of each other; a spindle slidably mounted within said rear bore and adapted to engage the rear portion of the capillary tip; said body having a seat therein coaxial with said rear and forward bores and disposed therebetween and adapted to receive the forward end of the capillary tip; means for shifting said spindle toward said seat to clamp the capillary tip between said spindle and seat with the tip passage and its orifice coaxial of said forward bore; and a punch slidably mounted in said forward bore and having an orifice clearing portion conforming in diameter to the diameter of the tip orifice and movable with said punch in a direction toward said seat axially in the orifice to clear the same.

2. In apparatus for unplugging a lead bonding capillary tip having a passage therethrough terminating in an orifice at its forward end; a body having rear, intermediate, and forward cylindrical bores longitudinally spaced from one another and having the same internal diameter; a spindle slidably mounted in and conforming in diameter to said rear bore and adapted to engage the rear end of the tip; a seat conforming in diameter to and mounted in said intermediate bore, said seat having a socket adapted to receive the forward end of the capillary tip; means for shifting said spindle toward said seat to clamp the capillary tip between said spindle and seat with the tip passage and its orifice coaxial of said forward bore; and a punch slidably mounted in said forward bore and having an orifice clearing portion conforming in diameter to the diameter of the tip orifice and movable with said punch in a direction toward said seat axially in the orifice to clear the same.

3. In apparatus for unplugging a lead bonding capillary tip having a passage therethrough terminating in an orifice at its forward end, the tip also having a peripherally tapered forward nose; a body having rear and forward bores coaxial of each other; a spindle slidably mounted in said rear bore and adapted to engage the rear portion of the capillary tip; a seat in said body coaxial with said rear and forward bores, said seat having a tapered socket conforming in taper to and adapted to receive the tapered nose of the tip; means for shifting said spindle toward said seat to clamp the capillary tip between said spindle and seat with the tip passage and its orifice coaxial of said forward bore; and a punch slidably mounted in said forward bore and having an orifice clearing portion conforming in diameter to the diameter of the tip orifice and movable with said punch in a direction toward said seat axially in the orifice to clear the same.

4. In apparatus for unplugging a lead bonding capillary tip having a passage therethrough terminating in an orifice at its forward end, the tip also having a peripherally tapered forward nose; a body having rear, intermediate, and forward cylindrical bores longitudinally spaced from one another and having the same internal diameters; a spindle slidably mounted in and conforming in diameter to said rear bore and adapted to engage the rear end of the tip; a seat conforming in diameter to and mounted in said intermediate bore, said seat having a tapered socket conforming in taper to and adapted to receive the tapered nose of the tip; means for shifting said spindle toward said seat to clamp the capillary tip between said spindle and seat with the tip passage and its orifice coaxial of said forward bore; and a punch slidably mounted in said forward bore and having an orifice clearing portion conforming in diameter to the diameter of the tip orifice and movable with said punch in a direction toward said seat axially in the orifice to clear the same.

5. In apparatus for unplugging a lead bonding capillary tip having a passage therethrough terminating in an orifice at its forward end, the tip also having a peripherally tapered forward nose; a body having rear, intermediate, and forward cylindrical bores longitudinally spaced from one another and having the same internal diameters; a spindle slidably mounted in and conforming in diameter to said rear bore and adapted to engage the rear end of the tip; a seat conforming in diameter to and mounted in said intermediate bore, said seat having a tapered socket conforming in taper to and adapted to receive the tapered nose of the tip; a bushing in said body coaxial of said rear bore; a spring in said rear bore engaging said bushing and said spindle for urging said spindle toward said seat to clamp the capillary tip between said spindle and seat with the tip passage and its orifice coaxial of said forward bore; means on said spindle for moving said spindle in a rearward direction in said rear bore away from said seat against the force of said spring; and a punch slidably mounted in said forward bore and having an orifice clearing portion conforming in diameter to the diameter of the tip orifice and movable with said punch in a direction toward said seat axially in the orifice to clear the same.

References Cited by the Examiner
UNITED STATES PATENTS

| | | | |
|---|---|---|---|
| 1,428,815 | 9/1922 | Starkey | 29—263 |
| 1,454,086 | 5/1923 | Staugaard | 29—263 |
| 1,534,436 | 4/1925 | Wilkinson | 29—244 |
| 2,253,845 | 8/1941 | Clickner | 30—263 |
| 2,863,212 | 12/1958 | Peterson | 29—227 |
| 2,899,741 | 8/1959 | Dunkerley | 29—263 |

WILLIAM FELDMAN, *Primary Examiner.*

Dedication 3,220,100.—*Frank L. Christensen*, Saratoga, Calif. APPARATUS FOR UN-
PLUGGING LEAD BONDING CAPILLARY TOOLS. Patent
dated Nov. 30, 1965. Dedication filed Aug. 11, 1971, by the assignee,
*Tempress, Inc.*
Hereby dedicates to the Public the entire term of said patent.
[*Official Gazette December 14, 1971.*]